United States Patent [19]

Yonekawa et al.

[11] Patent Number: 5,042,834
[45] Date of Patent: Aug. 27, 1991

[54] FLUID PRESSURE TYPE ACTIVE SUSPENSION WITH BYPASS CONTROL FOR WORKING FLUID PRESSURE OPERATIVE WITH VARIABLE TARGET VALUE

[75] Inventors: Takashi Yonekawa, Mishima; Shuuichi Buma; Toshio Aburaya, both of Toyota; Kunihito Sato, Susono; Masaki Kawanishi, Toyota; Kouichi Kokubo, Nagoya; Yutaka Iguchi, Toyoake, all of Japan

[73] Assignees: Toyota Jidosha Kabushiki Kaisha; Aisen Seiki Kabushiki Kaisha, both of Aichi, Japan

[21] Appl. No.: 565,962

[22] Filed: Aug. 13, 1990

[30] Foreign Application Priority Data

Aug. 30, 1989 [JP] Japan .................................. 1-223488

[51] Int. Cl.⁵ ............................................ B60G 11/26
[52] U.S. Cl. .................................. 280/707; 280/714; 364/424.05
[58] Field of Search ....................... 280/707, 709, 714; 364/424.05

[56] References Cited

U.S. PATENT DOCUMENTS

| 4,852,905 | 8/1989 | Tanaka et al. | 280/707 |
| 4,865,348 | 9/1989 | Hano et al. | 280/707 |
| 4,911,470 | 3/1990 | Fukunaga | 280/707 |
| 4,957,309 | 9/1990 | Komazawa et al. | 280/707 |
| 4,967,361 | 10/1990 | Kamimura et al. | 364/424.05 |
| 4,971,353 | 11/1990 | Buma et al. | 280/707 |
| 4,973,080 | 11/1990 | Ikemoto et al. | 280/707 |

FOREIGN PATENT DOCUMENTS

| 62-187609 | 8/1987 | Japan . | |
| 106127 | 5/1988 | Japan | 280/707 |
| 94008 | 4/1989 | Japan | 280/707 |
| 2-133217 | 5/1990 | Japan . | |
| 2-155814 | 6/1990 | Japan . | |
| 2-155819 | 6/1990 | Japan . | |

Primary Examiner—Charles A. Marmor
Assistant Examiner—Tamara L. Finlay
Attorney, Agent, or Firm—Oliff & Berridge

[57] ABSTRACT

In a fluid pressure type active suspension in a vehicle such as an automobile, having a fluid pressure type actuator supporting a vehicle body from a wheel so as to be able to vary a height of the vehicle body relative to the wheel in accordance with a fluid pressure supplied to its fluid chamber, a fluid supply passage for supplying a working fluid to the fluid chamber of the actuator, a fluid exhaust passage for exhausting the working fluid from the fluid chamber of the actuator, and a pressure control circuit including a switching-over valve traversing the fluid supply passage and the fluid exhaust passage so as to be operated by a pilot pressure to selectively connect the fluid chamber of the actuator with either the fluid supply passage or the fluid exhaust passage for controlling the fluid pressure supplied to the fluid chamber of the actuator, a variable throttle valve for generating the pilot pressure for operating the switching-over valve from the pressure of the working fluid in the fluid supply passage by releasing a part of the working fluid therefrom, and a throttle control device for controlling the variable throttle valve so as to control the pilot pressure to a target value, the pressure control circuit comprises a means for modifying the target value to be lowered when the difference between the pressure of fluid in the fluid supply passage means at an upstream side of the pressure control circuit and the target value is smaller than a certain threshold value.

3 Claims, 12 Drawing Sheets

FLUID PRESSURE TYPE ACTIVE SUSPENSION WITH BYPASS CONTROL FOR WORKING FLUID PRESSURE OPERATIVE WITH VARIABLE TARGET VALUE

BACKGROUND OF THE INVENTION

1. Field of the Invention

The present invention relates to a suspension in a vehicle such as an automobile, and more particularly to a fluid pressure type active suspension.

2. Description of the Prior Art

As shown in, for example, Japanese Patent Laying-open Publication 62-187609 it is known to incorporate a fluid pressure type active suspension in a vehicle such as an automobile which comprises a fluid pressure type actuator provided between a vehicle body and a wheel, a fluid supply passage for supplying a working fluid to said actuator, a fluid exhaust passage for exhausting the working fluid from said actuator, a pressure control means traversing said fluid supply passage and said fluid exhaust passage so as to control supply and exhaust of the working fluid to and from said actuator so as thereby to control the fluid pressure in said actuator, and a control means for controlling said pressure control means in accordance with running conditions of the vehicle.

Further, as described in, for example, the specification of Japanese Patent Laying-open Publication 2-133217 assigned to the same assignee as the present application it has already been proposed to construct the pressure control means of the above-mentioned type so as to comprise a release passage for releasing a very small part of the working fluid from said fluid supply passage and fixed and variable throttle means provided in said release passage so as to thereby generate a pilot pressure controlled by the variable throttling effect of said variable throttle means and to operate a switching-over valve in the pressure control means by said pilot pressure so as thereby to control the pressure in said actuator by the control of the variable throttle means.

Such a pressure control means is diagrammatically illustrated FIG. 15 of the attached drawing.

Referring first to this FIG., 300 and 302 designate a pump and a reserve tank, respectively, and 304 and 306 designate a pressure control means and an actuator, respectively. The pump 300 is connected by a fluid supply passage 308 with a port 312 of a spool valve 310 serving as a switching-over control valve in the pressure control means, while a port 316 of the spool valve is connected with the reserve tank 302 by a fluid exhaust passage 314. A passage 320 connects a working fluid chamber 318 of the actuator 306 with a port 322 of the spool valve 310. An accumulator 324 is connected to the fluid supply passage 308, and a gas spring 326 is connected to the passage 320.

The spool valve 310 has a housing 328 and a valve element 330 disposed to be reciprocable in said housing. Pilot chambers 332 and 334 and an annular space 336 are defined by the housing and the valve element.

The fluid supply passage 308 is connected with the fluid exhaust passage 314 by a release passage 338, and a fixed throttle means 340 and a pilot valve 342 are provided to in the release passage in said order. The pilot valve comprises a solenoid 344, a valve element 346 and a variable throttle port 348 the opening of which is varied in accordance with positioning of said valve element by said solenoid. A valve chamber 350 formed on the upstream side of the variable throttle port of the pilot valve is connected with the pilot chamber 332 of the spool valve 310 by a pilot passage 352. The pilot chamber 334 of the spool valve 310 is connected with the passage 320 by a pilot passage 354.

Therefore, when the opening of the variable throttle port 348 is increased by a control of the electric current supplied to the solenoid of the pilot valve 342, the pressure in the valve chamber 350 is lowered as a result of increase of the pressure drop across the fixed throttle means 340. Along with lowering of the pilot pressure Pp in the pilot chamber 332 the valve element 330 moves downward in the figure, and accordingly the port 316 is connected with the port 322, and therefore the pressure in the working pressure chamber 318 of the actuator 306 lowers. On the contrary, when the opening of the pilot valve 342 is decreased, the pilot pressure in the pilot chamber 332 rises, so that valve element 330 moves upward in the figure, so that the port 312 is connected with the port 332, and therefore the pressure in the working fluid chamber 318 rises.

In the fluid pressure type active suspension incorporating such a pilot type pressure control means the consumption of the working fluid increases when the vehicle runs on a rough road or makes a continuous slalom driving, and if as a result the amount of the working fluid in the accumulator 324 decreases, the pressure in the supply passage 308 lowers. Therefore, when the control operation of the pressure control means is continued under such running conditions of the vehicle, the pressure in the fluid supply passage 308 will approach a target pressure to be set up in the working fluid chamber 318 or would become even lower than such a target pressure under certain circumstances.

Under such operating conditions the pilot valve 342 gets to a fully closed or a almost fully closed state, and therefore the flow of the working fluid through the pilot valve decreases to a very low flow value, and therefore the relation between the force generated by the solenoid 344 to bias the valve element 346 upward in the figure and the pilot pressure in the chamber 350 to bias the valve element 346 downward in the figure becomes nonlinear, resulting in an unstable operation of the pilot valve so that the valve element of the pilot valve vibrates. If it happens, the pilot pressure fluctuates, thereby causing vibrations of the valve element 330 of the spool valve 304, thereby causing fluctuations of the pressure in the working fluid chamber of the actuator, thereby causing vibrations of the actuator, resulting in vibrations of vehicle body and/or noise generation.

SUMMARY OF THE INVENTION

In view of the above-mentioned problems in such a fluid pressure active suspension incorporating a pilot pressure type control means, it is the object of the present invention to provide an improved fluid pressure type active suspension in which no vibration or noise occurs even when the pressure of the working fluid in the fluid supply passage lowers so much as to approach a target pressure to be set up in the working fluid chamber of the active suspension actuator.

According to the present invention the above-mentioned object is accomplished by a fluid pressure type active suspension in a vehicle such as an automobile, comprising a fluid pressure type actuator having a fluid chamber and supporting a vehicle body from a wheel so as to be able to vary a height of said vehicle body relative to said wheel in accordance with a fluid pressure supplied to said fluid chamber, a fluid supply passage means for supplying a working fluid to said fluid chamber of said actuator, a fluid exhaust passage means for exhausting the working fluid from said fluid chamber of said actuator, and a pressure control means including a switching-over valve means traversing said fluid supply passage means and said fluid exhaust passage means so as to be operated by a pilot pressure to selectively connect said fluid chamber of said actuator with either said fluid supply passage means or said fluid exhaust passage means for controlling the fluid pressure supplied to said fluid chamber of said actuator, a variable throttle means for generating said pilot pressure from the pressure of the working fluid in said fluid supply passage means by releasing a part of the working fluid therefrom, and a throttle control means for controlling said variable throttle means so as to control said pilot pressure to a target value, wherein said pressure control means comprises a means for modifying said target value to be lowered when the difference between the pressure of the working fluid in said fluid supply passage means at an upstream side of said pressure control means and said target value is smaller than a certain threshold value.

In more detail, said modification of said target value may be lowered to a value between said target value before the modification thereof and the difference between the pressure of fluid in said fluid supply passage means at the upstream side of said pressure control means and said threshold value, or said target value may be lowered to the difference between the pressure of fluid in said fluid supply passage means at the upstream side of said pressure control means and said threshold value.

When the target pressure value lowered from the originally calculated value as described above, the neutral point of the active suspension control, i.e. the fluid pressure value for the actuator up and down of which the pressure to be control temporarily deviates is somewhat shifted toward a lower pressure side, so that the active suspension control is performed with sufficient control allowances on opposite sides of the neutral point of control. Although the vehicle height is correspondingly decreased by the lowering of the target pressure value, when the rough road conditions, the continuous slalom driving or the like which would cause the undue reduction of the source fluid pressure terminates, the source fluid pressure will be quickly recovered as in a few seconds, and therefore there is no problem in temporarily lowering the target pressure values Pui.

BRIEF DESCRIPTION OF THE DRAWINGS

In the accompanying drawings.

DESCRIPTION OF THE PREFERRED EMBODIMENT

In the following the present invention will be described with respect to a preferred embodiment with reference to the accompanying drawings.

Figure 1:
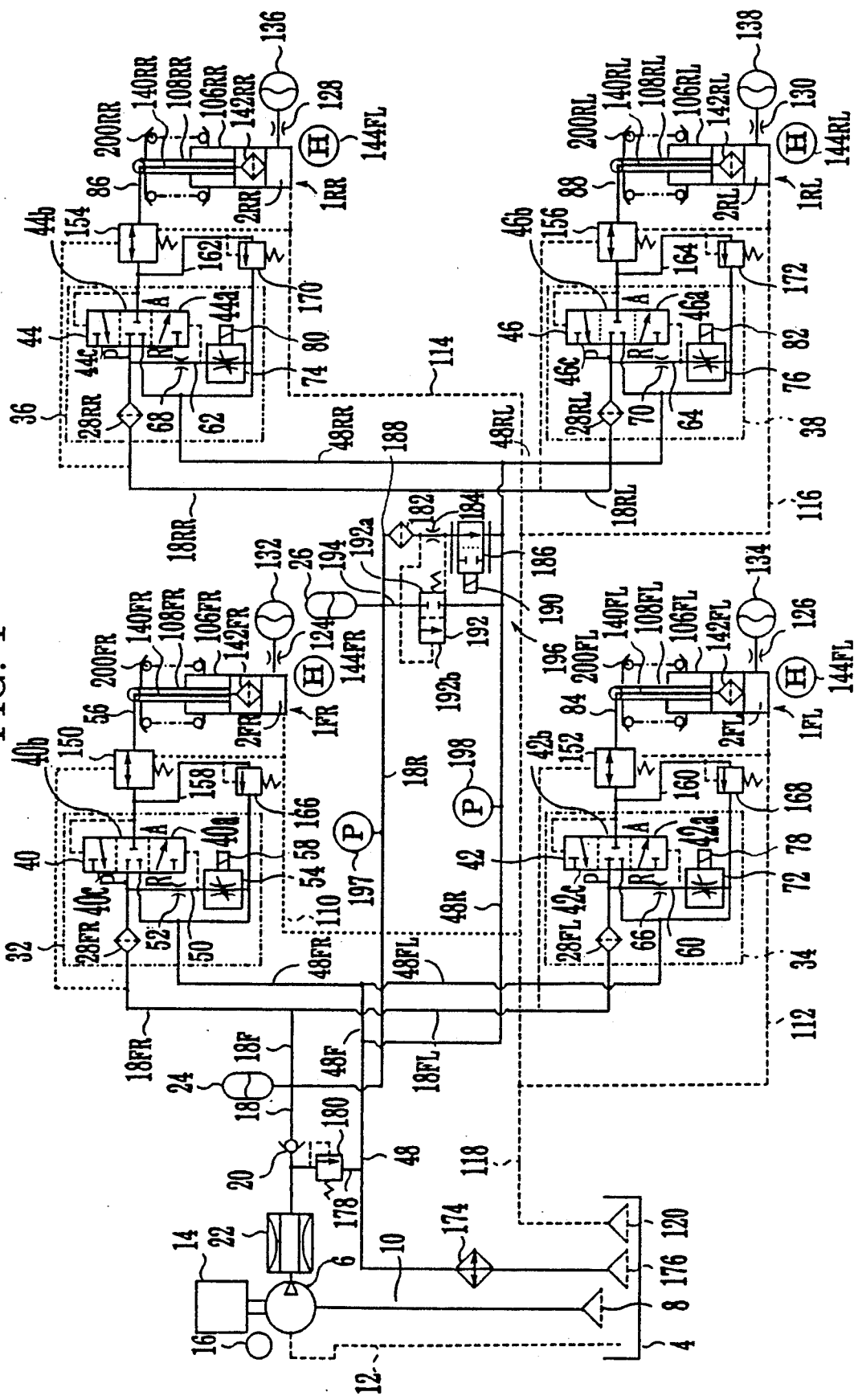
FIG. 1 is a diagrammatic illustration of the fluid pressure circuits of an embodiment of the fluid pressure type active suspension system according to the present invention.

Referring to FIG. 1, a diagrammatic view showing the fluid circuits of the embodiment of the fluid pressure type active suspension system according to the present invention, the suspension system shown in this figure includes actuators 1FR, 1FL, 1RR and 1RL provided for front right, front left, rear right and rear left vehicle wheels, not shown, respectively. These actuators have therein working fluid chambers 2FR, 2FL, 2RR, and 2RL, respectively.

In the FIG., 4 designates a reserve tank which contains oil serving as the working fluid, and the tank 4 is connected to the suction side of a pump 6 by a suction line 10 having therein a filter 8 for removing foreign materials from the oil. To the pump 6 is connected with a drain line 12 which collects the oil leaked in the pump and returns it to the reserve tank 4. The pump 6 is drivingly connected with and rotationally driven by an engine 14, the rotational speed of which is detected by a rotational speed sensor 16.

A high pressure line 18 is connected with the discharge side of the pump 6. A check valve 20 is incorporated in the high pressure line 18 so as to permit only the flow of oil in the direction from the pump toward the actuators, and between the pump 6 and the check valve 20 is provided an attenuator 22 which serves to absorb or dampen the pressure pulsation of the oil discharged from the pump, thereby reducing the pressure variation. The high pressure line 18 for is connected with one end each of a high pressure line 18F for the front vehicle wheels and a high pressure line 18R for the rear vehicle wheels, with which are connected accumulators 24 and 26, respectively. These accumulators contain therein pressurized gas and serve to absorb pressure variation of the oil and to accumulate pressure. A high pressure line 18FR for the front right vehicle wheel and a high pressure line 18FL for the front left vehicle wheel are each connected at one end thereof with the high pressure line 18F, while a high pressure line 18RR for the rear right vehicle wheel and a high pressure line 18RL for the rear left vehicle wheel are each connected at one end thereof with the high pressure line 18R. The high pressure lines 18FR, 18FL, 18RR and 18RL have therein filters 28FR, 28FL, 28RR and 28RL, respectively, and are connected at their other ends with ports P of pilot-operated three-port switching control valves 40, 42, 44 and 46 included in pressure control means 32, 34, 36 and 38, respectively.

The pressure control means 32 comprises the switching control valve 40, a line 50 for connecting the high pressure line 18FR with a low pressure line 48FR for the front right vehicle wheel a fixed throttle means 52 and a variable throttle means 54 both provided in the line 50. The switching control valve 40 has, in addition to the port P, ports R and A connected with a low pressure line 48FR and a connection line 56, respectively. The switching control valve 40 may be a spool type valve adapted to be switched over by a pilot pressure Pp taken from the line 50 at a portion between the throttle means 52 and 54 and a pressure Pa taken from the connection line 56 to a switching position 40a where it communicates the port P with the port A when the pressure Pp is substantially higher than the pressure Pa; a switching position 40b where it interrupts communication among all the ports when the pressure Pp is substantially equal to Pa; and a shifting position 40c where it communicates the port R with the port A when the pressure Pp is substantially lower than the pressure Pa. The variable throttle means 54 is adapted to vary its effective flow area by the electric current supplied to its solenoid 58 being controlled and to cooperate with the fixed throttle means 52 to variably control the pilot pressure Pp.

Similarly, the pressure control means 34, 36 and 38 comprise pilot-operated, three-port switching control valves 42, 44 and 46 corresponding to the valve 40, lines 60, 62 and 64 corresponding to the line 50, fixed throttle means 66, 68 and 70 corresponding to the fixed throttle means 52, and variable throttle means 72, 74 and 76 corresponding to the variable throttle means 54, respectively. The variable throttle means 72, 74 and 76 have solenoids 78, 80 and 82, respectively, corresponding to the solenoid 58.

The switching control valves 42, 44 and 46 have the same construction as the switching valve 40, and have the ports R connected with one end of a low pressure line 48FL for the front left vehicle wheel, a low pressure line 48RR for the rear right vehicle wheel, and a low pressure line 48RL for the rear left vehicle wheel, respectively, and the ports A connected with one end of connection lines 84, 86 and 88, respectively. The switching control valves 42, 44 and 46 are spool type valves adapted to take in as pilot pressures therefor the pressures Pp in the associated lines 60, 62 and 64 between the associated fixed and the variable throttling means and the pressures Pa in the associated lines 84, 86 and 88, and to be shifted to switching positions 42a, 44a and 46a, respectively, where they communicate the ports P with the ports A when the pressures Pp are substantially higher than the pressures Pa; shifting positions 42b, 44b and 46b where they interrupt communications among all the ports when the pressures Pp are substantially equal to the pressures Pa; and shifting positions 42c, 44c and 46c where they communicate the ports R with the ports A when the pressures Pp are substantially lower than the pressures Pa.

As shown schematically in FIG. 1, the actuators 1FR, 1FL, 1RR and 1RL include cylinders 106FR, 106FL, 106RR and 106RL and pistons 108FR, 108FL, 108RR and 108RL reciprocably inserted into the associated cylinders, defining working fluid chambers 2FR, 2FL, 2RR and 2RL, respectively. While in the shown embodiment the actuators are located between a vehicle body, not shown, and associated suspension arms, also not shown, with each cylinder being coupled to the associated suspension arm and the upper end of the rod portion of each piston being coupled to the vehicle body, each cylinder may be coupled to the vehicle body while each piston may be coupled the associated suspension arm. Drain lines 110, 112, 114 and 116 are connected at each one end with the cylinders 106FR, 106FL, 106RR and 106RL of the actuators, respectively. The other ends of the drain lines 110, 112, 114 and 116 are connected with a drain line 118 which in turn is connected with the reserve tank 4 by way of a filter 120 so that the oil leaked from the working fluid chambers may be returned to the tank.

Accumulators 132, 134, 136 and 138 are connected to the working fluid chambers 2FR, 2FL, 2RR and 2RL by way of throttle means 124, 126, 128 and 130, respectively, serving as hydropneumatic springs. The pistons 108FR, 108FL, 108RR and 108RL have therein passages 140FR, 140FL, 140RR and 140RL, respectively. These passages connect the associated lines 56, 84, 86 and 88 with the associated working fluid chambers 2FR, 2FL, 2RR and 2RL, respectively, and have therein filters 142FR, 142FL, 142RR and 142RL, respectively. Adjacent the actuators 1FR, 1FL, 1RR and 1RL are installed vehicle height sensors 144FR, 144FL, 144RR and 144RL, respectively, for detecting vehicle heights corresponding to the associated vehicle wheels.

The lines 56, 84, 86 and 88 have therein pilot-operated cut-off valves 150, 152, 154 and 156, respectively, which are in closed conditions whenever the pressure differences between the pressures in the high pressure lines 18FR, 18FL, 18RR and 18RL upstream of the associated pressure control valves 40, 42, 44 and 46, respectively, and the pressures in the drain lines 110, 112, 114 and 116, respectively, are not more than respective predetermined values. The lines 56, 84, 86 and 88 are, at portions thereof between the associated pressure control valves and the cut-off valves, connected with the line 50, 60, 62 and 64 on the downstream side of the associated variable throttle means by lines 158, 160, 162 and 164, respectively, which have therein relief valves 166, 168, 170 and 172, respectively, adapted to take in as pilot pressures therefor the pressures in the associated lines 158, 160, 162 and 164, respectively, on the upstream side thereof, and to open when the pilot pressures exceed respective predetermined values so as thereby to conduct a certain amount of oil in the connection lines to the lines 50, 60, 62 and 64, respectively.

The cut-off valves 150, 152, 154 and 156 may be adapted to remain closed whenever the differences between the pressures in the high pressure lines 18FR, 18FL, 18RR and 18RL and the atmospheric pressure are not more than respective predetermined values.

The lines 48FR and 48FL are connected at their other ends with one end of a low pressure line 48F for the front vehicle wheels, while the lines 48RR and 48RL are connected at their other ends with one end of a low pressure line 48R for the rear vehicle wheels. The lines 48F and 48R are connected at their other ends with one end of a low pressure line 48. The line 48 has therein an oil cooler 174 and is connected at the other end with the reserve tank 4 by way of a filter 176. The high pressure line 18 is, at a portion thereof between the check valve 20 and the attenuator 22, connected with the low pressure line 48 by a line 178. The line 178 has therein a relief valve 180 adapted to open when its pilot pressure is higher than a predetermined value.

The high pressure line 18R and the low pressure line 48R are connected with each other by a line 188 which has therein a filter 182, a throttle means 184 and a normally open type electromagnetic on-off valve 186 including a solenoid 190 for controlling the valve opening. The on-off valve 186 is adapted to open when its solenoid 190 is energized and to control the flow rate of the oil flowing therethrough according to control of the energizing electric current supplied thereto. The high pressure line 18R and the low pressure line 48R are further connected with each other by a line 194 having therein a pilot-operated on-off valve 192. The on-off valve 192 is adapted to take in as a pilot pressure therefor the pressures on opposite sides of the throttle means 184 and to remain in its closed position 192a when no substantial pressure difference exists between the pressures on opposite sides of the throttle means 184 and to be switched over to its open position 192b when the pressure difference across the throttle means 184 is higher than a predetermined value. Thus, the throttle means 184, the electromagnetic on-off valve 186 and the on-off valve 192 cooperate with each other to define a bypass means 196 which selectively communicates the high pressure line 18R with the pressure flow line 48R while controlling the flow rate of the oil flowing from the high pressure line to the low pressure line.

Further in the shown embodiment, a pressure sensor 197 is connected to the high pressure line 18R for detecting the oil pressure Ps therein and similarly a pressure sensor 198 is connected to the low pressure line 48R for detecting the oil pressure Pd therein. Pressure sensors 199FR, 199RL, 199RR and 199RL are connected to the connection lines 56, 84, 86 and 88 for detecting the oil pressure in the working fluid chambers 2FR, 2RL, 2RR and 2RL, respectively. A temperature sensor 195 is provided in the reserve tank 4 for detecting the temperature T of the oil in the tank. Compression coil springs 200FR, 200FL, 200RR and 200RL serving as suspension springs are interposed between upper seats attached to the rod portions of the pistons 108FR, 108FL, 108RR and 108RL incorporated in the actuators and the lower seats secured to the cylinders 106FR, 106FL, 106RR and 106RL, respectively.

Figure 2:
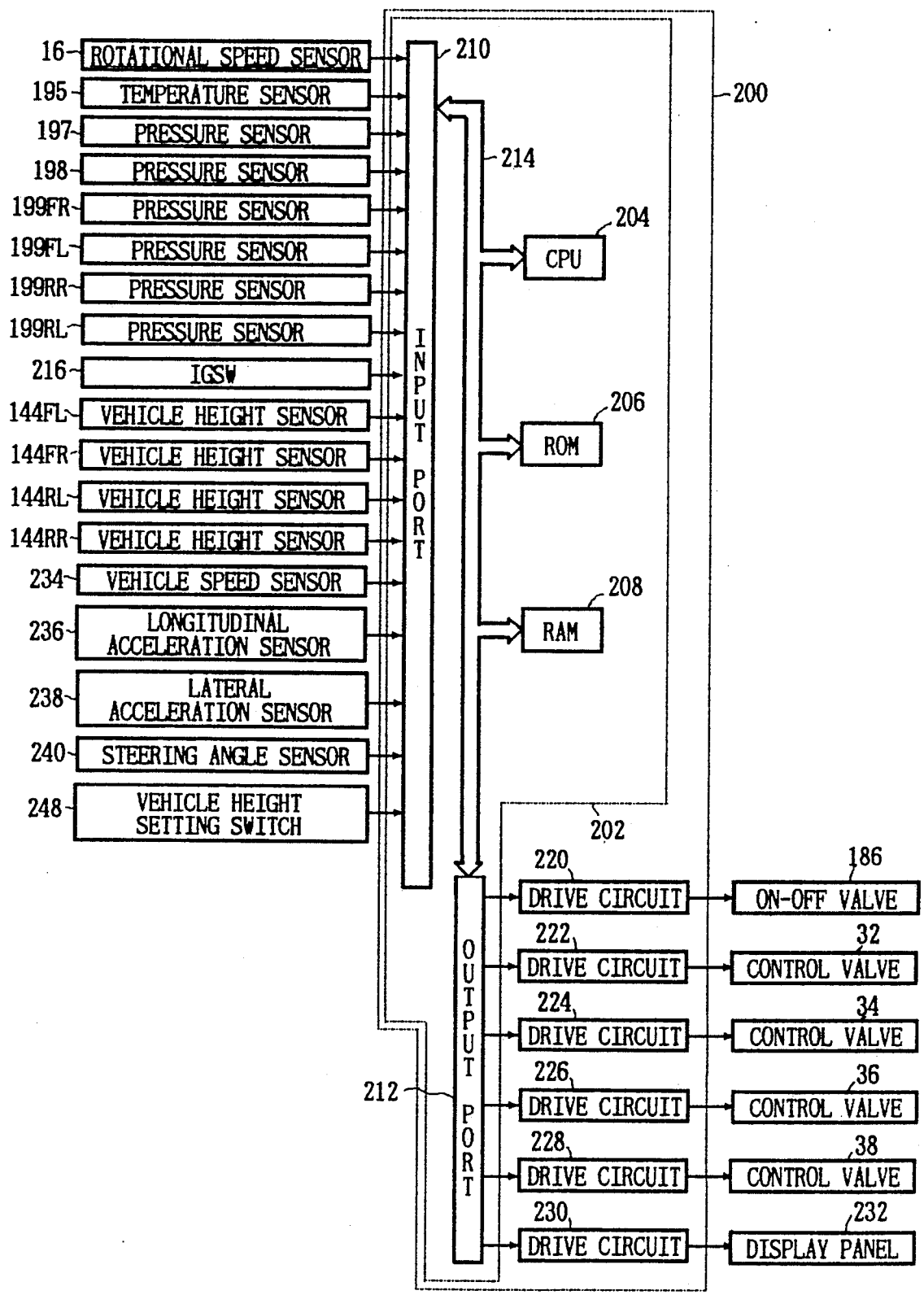
FIG. 2 is a block diagram showing an electric control device in the embodiment shown in FIG. 1.

The electromagnetic on-off valve 186 and the pressure control means 32, 34, 36 and 38 are controlled by an electric control device 200 shown in FIG. 2. The electric control device 200 includes a microcomputer 202. The microcomputer 202 may, as shown in FIG. 2, be of a conventional construction having a central processing unit (CPU) 204, a read only memory (ROM) 206, a random access memory (RAM) 208, an input port device 210, and an output port device 212, all of these interconnected with each other by a two way common bus 214.

The input port device 210 is supplied with a signal indicative of the rotational speed N of the engine 14 from the rotational speed sensor 16, a signal indicative of the temperature T of the oil from the temperature sensor 195, signals indicative of the pressures Ps and Pd within the high pressure and the low pressure lines from the pressure sensors 197 and 198, respectively, signals indicative of the pressures Pi (here "i" is "1" for the front left wheel, "2" for the front right wheel, "3" for the rear left wheel, and "4" for the rear right wheel) in the working fluid chambers 2FL, 2FR, 2RL and 2RR from the pressure sensors 199FL, 199FR, 199RL and 199RR, respectively, a signal indicative of whether or not an ignition switch (IGSW) 216 is on from the ignition switch, and signals indicative of the vehicle heights Xi (i=1, 2, 3 and 4) corresponding to the front left wheel, the front right wheel, the rear left wheel, and the rear right wheel from the vehicle height sensors 144FL, 144FR, 144RL and 144RR, respectively.

Further, the input port device 210 is supplied with a signal indicative of a vehicle speed V from a vehicle speed sensor 234, a signal indicative of a longitudinal acceleration Ga from a longitudinal acceleration sensor 236, a signal indicative of a lateral acceleration Gl from a lateral acceleration sensor 238, a signal indicative of a steering angle from a steering angle sensor 240, and a signal indicative of whether the mode Hset for controlling the vehicle height set by a vehicle height setting switch 248 is a high mode Hh or a normal mode Hn. The switch 248 is provided in the cabin to be operated by a driver or a passenger according to his taste.

The input port device 210 processes the signals input thereto in a predetermined manner, and under the control of the CPU 204 which is based upon the program stored in the ROM 206, outputs the processed signals to the CPU and the RAM 208. The ROM 206 stores the control flows shown in FIG. 3 and FIGS. 6A through 6C and the maps shown in FIGS. 4 and 5 and FIGS. 7 through 14. The output port device 212 outputs, under the control of the CPU 204, a control signal via drive circuit 220 to the electromagnetic on-off valve 186, control signals via drive circuits 222, 224, 226 and 228 to the pressure control means 32, 34, 36 and 38, or more exactly, to the solenoids 58, 78, 80 and 82 in the variable throttle means 54, 72, 74 and 76, respectively, and a control signal via a drive circuit 230 to a display panel 232.

Referring now to the flowchart shown in FIG. 3, the operation of the embodiment will be explained.

Figure 3:
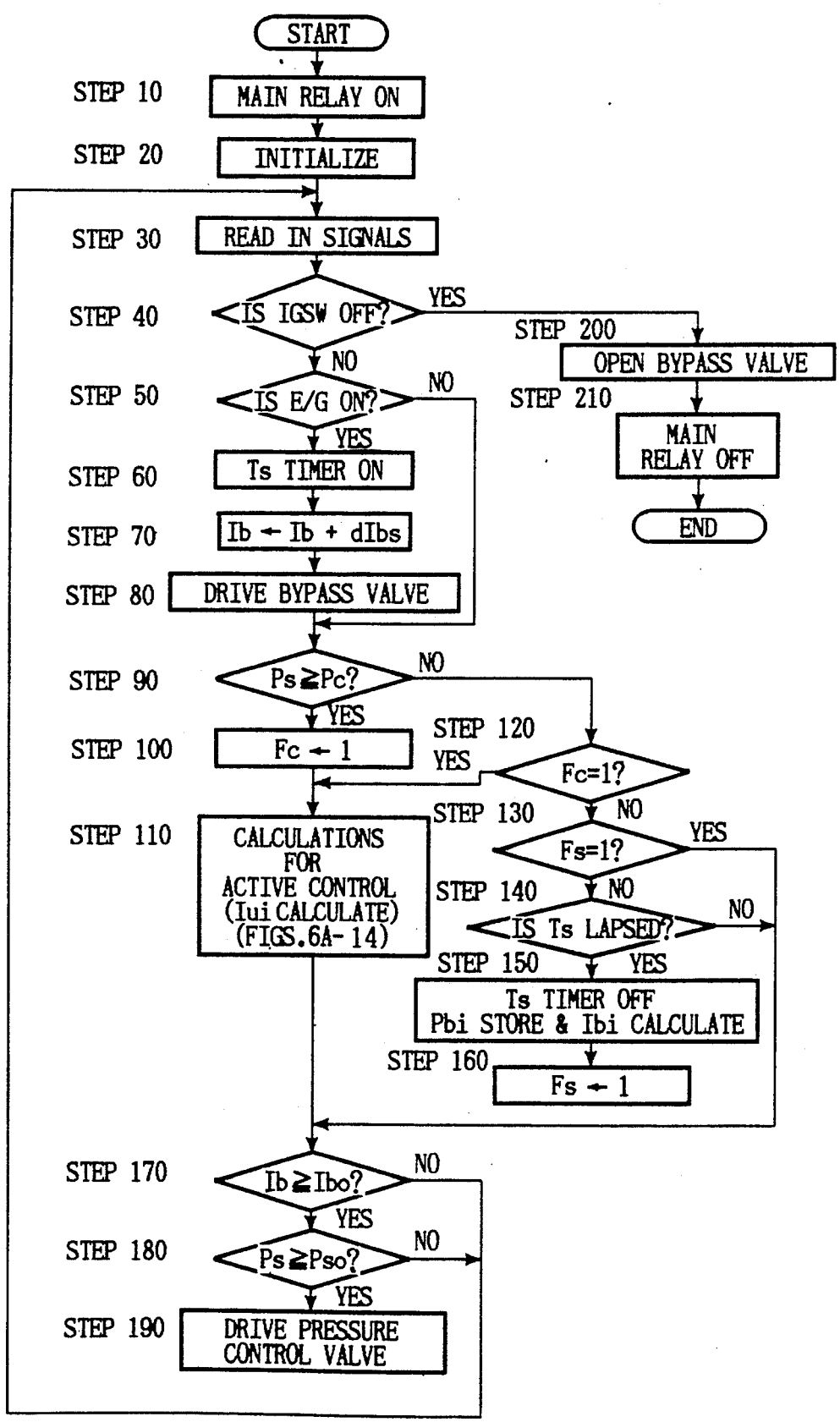
FIG. 3 is a flowchart showing a flow of control carried out by the electric control device shown in FIG. 2.

In this connection, it is to be noted that the routine of the control flow shown in FIG. 3 is initiated when the ignition switch 216 is turned on. It should also be noted that in the flowchart shown in FIG. 3, a flag Fc relates to whether or not the pressure Ps of the oil within the high pressure line has ever exceeded a threshold pressure Pc above which the cut-off valves 152, 150, 156 and 154 are completely opened and the Fc=1 means that the pressure Ps has ever exceeded the pressure Pc, and a flag Fs relates to whether or not standby pressures Pbi (i=1, 2, 3 and 4) referred to later have been set for the pressure control valves 34, 32, 38 and 36, and that Fs=1 means that the standby pressures have been set.

In the first step 10, a main relay, not shown in the figures, is turned on, and then the flow of control proceeds to step 20.

In step 20, the RAM 208 is cleared of all the information stored therein and all the flags are reset to zero, and then the flow of control proceeds to step 30.

In step 30, data are read in with respect to the signal indicative of the rotational speed N of the engine 14 detected by the rotational speed sensor 16, the signal indicative of the temperature T of oil detected by the temperature sensor 195, signals indicative of the pressures Ps and Pd in the high pressure and the low pressure line detected by the pressure sensors 197 and 198, respectively, the signals indicative of the pressures Pi in the working fluid chambers 2FL, 2FR, 2RL and 2RR detected by the pressure sensors 199FL, 199FR, 199RL and 199RR, the signal indicative of whether or not the ignition switch 216 is on, the signals indicative of the vehicle heights Xi detected by the vehicle heigts sensors 144FL, 144FR, 144RL and 144RR, the signal indicative of the vehicle speed V detected by the speed sensor 234, the signal indicative of the longitudinal acceleration Ga detected by the longitudinal acceleration sensor 236, the signal indicative of the lateral acceleration G1 detected by the lateral acceleration sensor 238, the signal indicative of the steering angle As detected by the steering angle sensor 240, and the signal indicative of whether the mode of controlling the vehicle height set by the vehicle height setting switch 248 is the high mode or the normal mode, and then the flow of control proceeds to step 40.

In step 40, it is judged if the ignition switch is off. If it is judged that the ignition switch is off, the flow of control proceeds to step 200, whereas if it is judged that the ignition switch is on, the flow of control proceeds to step 50.

In step 50, it is judged if the engine is running based upon whether or not the rotational speed N of the engine detected by the rotational speed sensor 16 and read in at step 30 is higher than a predetermined value. If it is judged that the engine is not running, the flow of control proceeds to step 90, whereas if it is judged that the engine is running, the flow of control proceeds to step 60.

It is to be understood that the judgement with regard to whether or not the engine is running may be made based upon other parameters such as, for example, whether or not the voltage of the electricity generated by an alternator, not shown, driven by the engine is higher than a predetermined value.

In step 60, a timer is started to count the period of time Ts from the time point at which the engine is stared to the time point at which the standby pressures Pbi are set for the pressure control means 34, 32, 38 and 36 in step 150, referred to later, and then the flow of control proceeds to step 70. If, however, the timer has already been started, it continues time counting.

Figure 4:
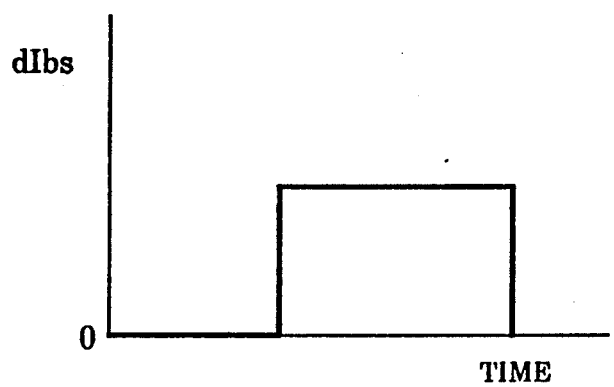
FIG. 4 is a graph showing a map used in calculating the electric current Ib to be supplied to the bypass control means when the active suspension system is being started.
Figure 5:
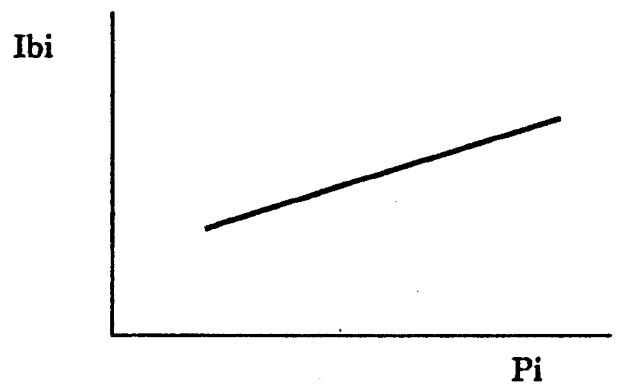
FIG. 5 is a graph showing a relation between the pressures Pi in the working fluid chambers of the actuators and the electric currents Ibi supplied to the pressure control means.
Figure 6A:
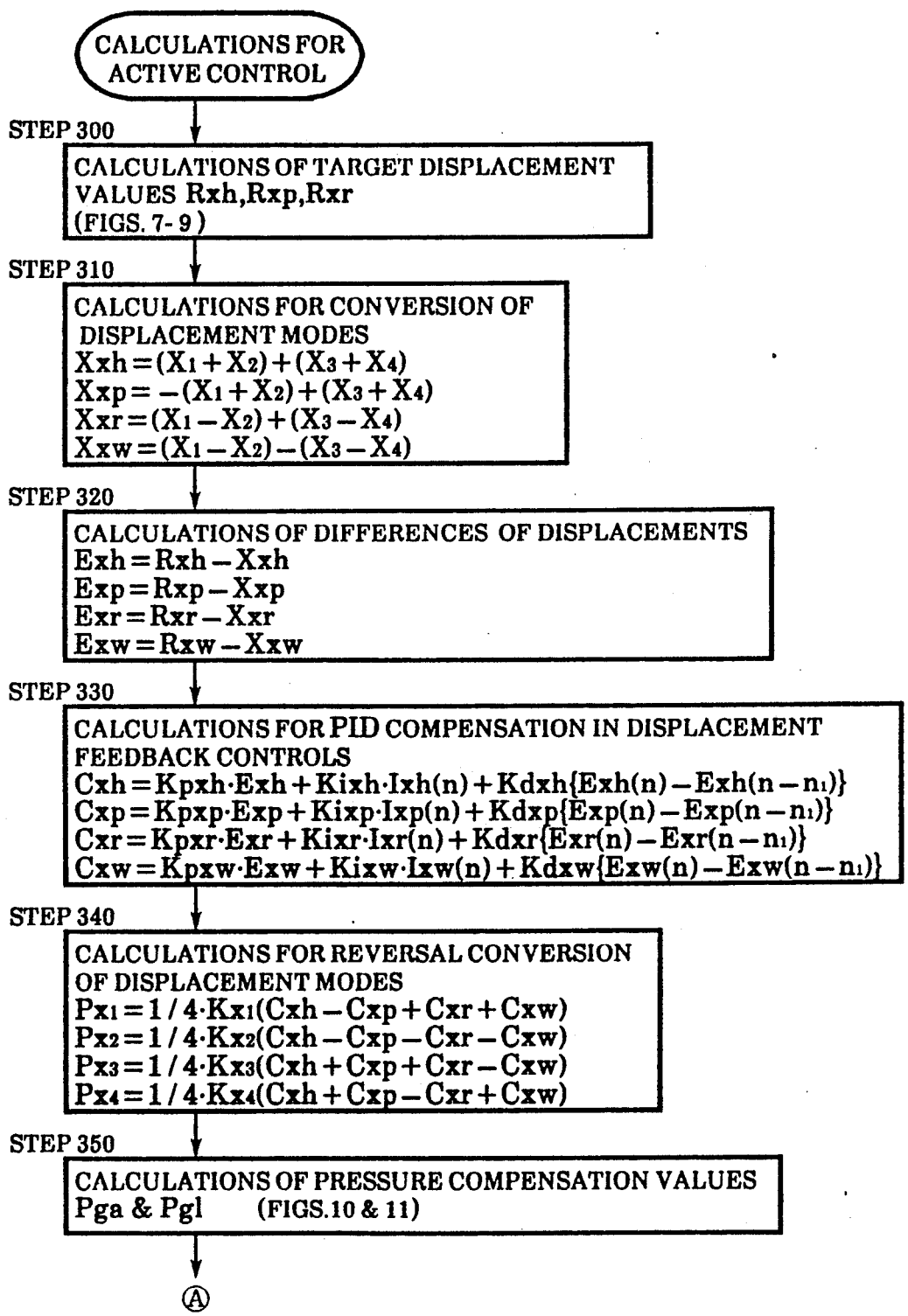
FIGS. 6A through 6C are flowcharts showing the subroutine calculations for the active control carried out in step 110 in the flowchart shown in FIG. 3.
Figure 6B:
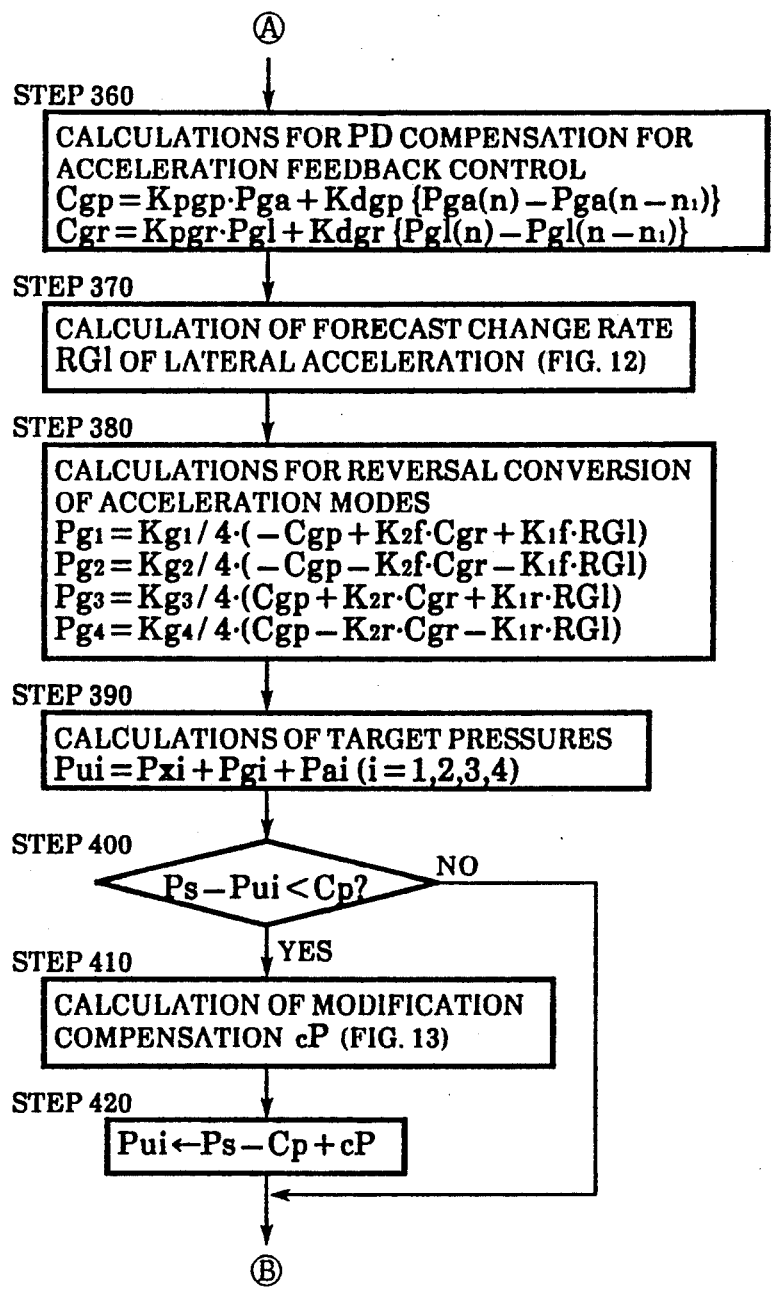
Figure 6C:
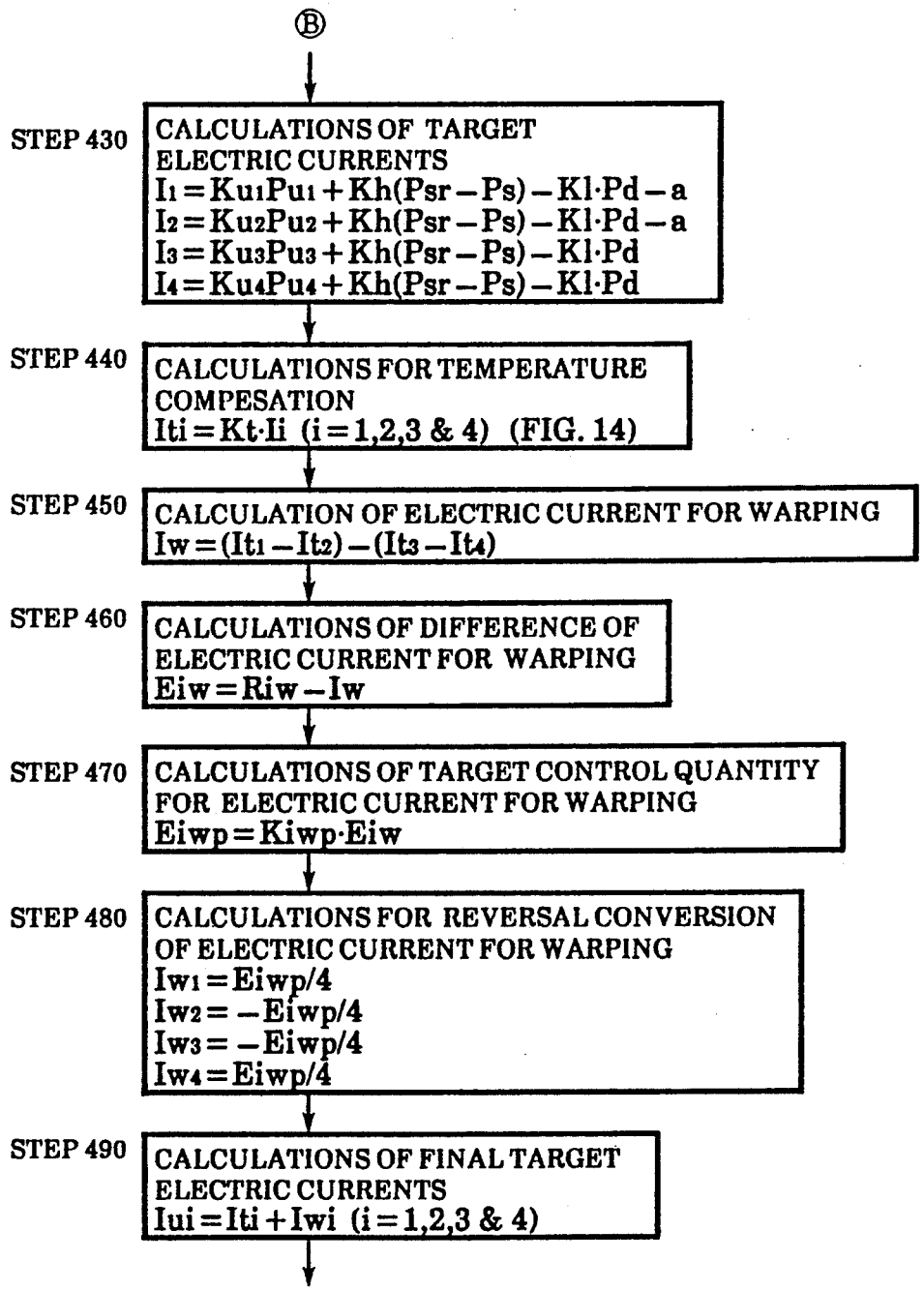

In step 70, an electric current Ib to be supplied to the solenoid 190 in the electromagnetic on-off valve 186 in the bypass control means 196 is calculated according to a map such as the graph shown in FIG. 4 and the following equation and is stored in ROM 206:

$$Ib = Ib + dIbs$$

Then the flow of control proceeds to step 80. In step 80, the electric current Ib calculated in the step 70 is supplied to the solenoid 190 in the electromagnetic on-off valve 186 so as thereby to shift the bypass control means 196 to its fully closed condition, and then the flow of control procceds to step 90.

In step 90, it is judged whether or not the pressure Ps in the high pressure line is equal to or higher than the threshold value Pc. If it is judged that Ps is less than Pc, the flow of control proceeds to step 120, whereas if it is judged that Ps is equal to or higher than Pc, the flow of control proceeds to step 100.

In step 100, the flag Fc is set to "1", and then the flow of control proceeds to step 110.

In step 110, as will be described in detail later with reference to FIGS. 6A through 6C and FIGS. 7 through 13, in order to control the comfortability of the vehicle and the attitude of the vehicle body, calculations for the active control are carried out based upon the data read at step 30 so as to calculate the electric currents Iui to be supplied to the solenoids 78, 58, 82 and 80 incorporated in the variable throttle means 72, 54, 76 and 74 in the pressure control means 34, 32, 38 and 36 and then the flow of control proceeds to step 170.

In step 120, it is judged whether or not the flag Fc is "1". If it is judged that the flag Fc is "1", i.e., the pressure Ps of the oil in the high pressure line has lowered to a level lower than the threshold pressure Pc after it had once been increased to a level equal to or higher than the threshold value, the flow of control proceeds to step 110, whereas if it is judged that the flag Fc is not "1", i.e., the pressure Ps has not yet been increased to a level equal to or higher than the threshold pressure Pc, then the flow of control proceeds to step 130.

In step 130, it is judged whether or not the flag Fs is "1". If it is judged that the flag Fs is "1", the flow of control proceeds to step 170, whereas if it is judged that the flag Fs is not "1", the flow of control proceeds to step 140.

In step 140, it is judged whether or not the time Ts has elapsed. If it is judged that the time Ts has not yet elapsed, the flow of control proceeds to step 170, whereas if it is judged that the time Ts has elapsed, the flow of control proceeds to step 150.

In step 150, the Ts timer is stopped, and the pressures Pi read in at step 30 are stored in the RAM 208 as the standby pressures Pbi, and further the values of the electric currents Ii (i=1, 2, 3 and 4) to be supplied to the solenoids 78, 58, 82 and 80 incorporated in the variable throttle means 72, 54, 76 and 74 in the pressure control means 34, 32, 38 and 36 are calculated based upon the map as shown in FIG. 4 stored in the ROM 206 so that the pressures in the connection lines 84, 56, 88 and 86 between the associated pressure control means and the associated cut-off valves are controlled to the respective standby pressures Pbi, i.e., the pressures which are substantially equal to the pressures Pi in the working fluid chambers 2FL, 2FR, 2RL and 2RR that are detected by the associated pressure sensors, and then the flow of control proceeds to step 160.

In step 160, the flag Fs is set to "1", and then the flow of control proceeds to step 170.

In step 170, it is judged whether or not the electric current Ib calculated in step 70 is not less than a reference value Ibo. If it is judged that the current Ib is less than Ibo, the flow of control is returned to step 30, whereas if it is judged that the current Ib is not less than Ibo, the flow of control proceeds to step 180.

In step 180, it is judged whether or not the pressure Ps in the high pressure line read in at step 30 is not less than a reference value Pso which is lower than the threshold value Pc. If it is judged that Ps is less than Pso, then the flow of control is returned to step 30, whereas if it is judged that Ps is not less than Pso, the flow of control proceeds to step 190.

In step 190, the electric currents Ibi calculated in step 150 or the electric currents Iui calculated in step 110 are supplied to the solenoids 78, 58, 82 and 80 incorporated in the variable throttle means included in the associated pressure control means so that they are operated to adjust the pressures in the working fluid chambers in the associated actuators, and then the flow of control is returned to step 30. Thus, the steps 30 through 190 are repeated.

In step 200, the supply of the electric current to the solenoid 190 in the electromagnetic on-off valve 186 is stopped to open the bypass control means 196, and then the flow of control proceeds to step 210.

In step 210, the main relay is turned off to finish the control flow shown in FIG. 3, and the supply of electricity to the electric control device 200 shown in FIG. 2 is stopped.

It is to be noted that the pressure control conducted by the bypass control means when the system is started forms no essential part of the present invention. For more details in this regard, if desired, reference should be made to Japanese Patent Laying-open Publication 2-155819 assigned to the assignee as the present application. It is also to be understood that the pressure control conducted by the bypass control means for stopping the system may be carried out in the same manner as in the system described in Japanese Patent Laying-open Publication 2-155814 assigned to the same assignee as the present application.

Referring next to the FIGS. 6A through 6C and FIGS. 7 through 15, calculations for the active control conducted in the above-mentioned step 110 will be described.

Figure 7:
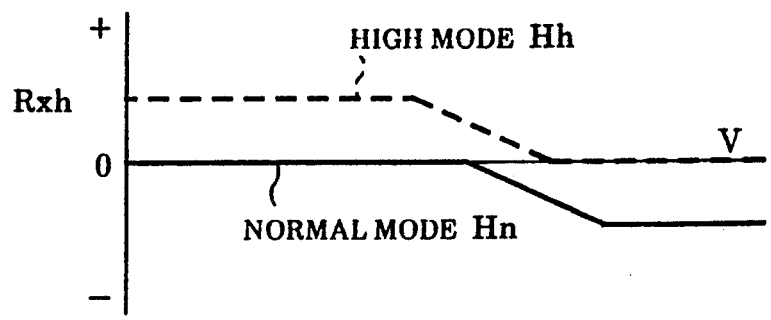
FIG. 7 is a graph showing a relation between a vehicle speed V and a target displacement Rxh.
Figure 8:
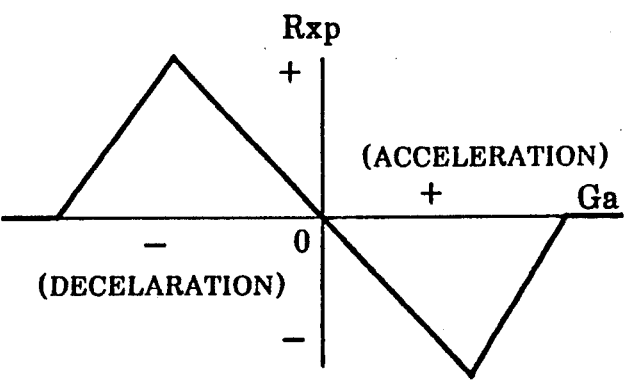
FIG. 8 is a graph showing a relation between a longitudinal acceleration Ga and a target displacement Rxp.
Figure 9:
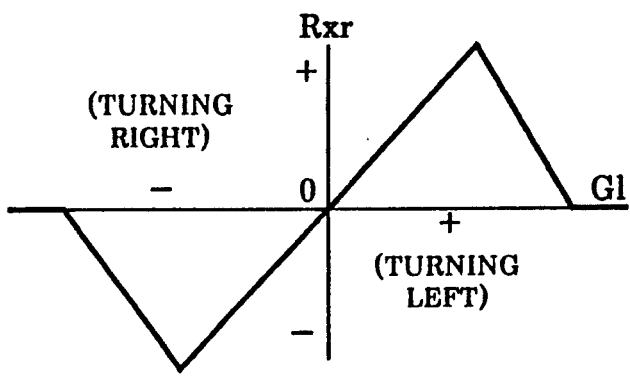
FIG. 9 is a graph showing a relation between a lateral acceleration G1 and a target displacement Rxr.

In step 300, based upon maps such as the graphs shown in FIGS. 7 through 9, target values Rxh, Rxp and Rxr for the heave, pitch and roll, respectively, required for attaining a desired attitude of the vehicle body are calculated, and then the flow of control proceeds to step 310.

It is to be noted that in FIG. 7, the solid line shows a normal mode pattern which is set up when the vehicle height setting switch is set to a normal mode and the dotted line shows a high mode pattern which is set up when the vehicle height setting switch is set to a high mode.

In step 310, based upon the vehicle heights X1, X2, X3 and X4 at the front left, front right, rear left, and rear right wheels read in at step 30, calculations for converting the displacements into values of heave "Xxh", pitch "Xxp", roll "Xxr" and warp "Xxw" are carried out according to the following equations, and thereafter the flow of control proceeds to step 320:

$$Xxh = (X1 + X2) + (X3 + X4)$$

$$Xxp = -(X1 + X2) + (X3 + X4)$$

$$Xxr = (X1 - X2) + (X3 - X4)$$

$$Xxw = (X1 - X2) - (X3 - X4)$$

In step 320, differences in the respective mode values are calculated according to the following equations, and then the flow of control proceeds to step 330:

$$Exh = Rxh - Xxh$$

$$Exp = Rxp - Xxp$$

$$Exr = Rxr - Xxr$$

$$Exw = Rxw - Xxw$$

In this connection, Rxw may be zero, or a value of Xxw calculated in step 410 just after the active suspension system has been started up to operate or an average value of Xxw calculated in the last few cycles. If the absolute value of Exw is equal to or less than W₁ (a certain positive constant), Exw is set to zero.

In step 330, calculations for PID compensations in a displacement feedback control are conducted according to the following equations, and thereafter the flow of control proceeds to step 340.

$$Cxh = Kpxh \cdot Exh + Kixh \cdot Ixh(n) + Kdxh\{Exh(n-)-Exh(n-n1)\}$$

$$Cxp = Kpxp \cdot Exp + Kixp \cdot Ixp(n) + Kdxp\{Exp(n-)-Exp(n-n1)\}$$

$$Cxr = Kpxr \cdot Exr + Kixr \cdot Ixr(n) + Kdxr\{Exr(n-)-Exr(n-n1)\}$$

$$Cxw = Kpxw \cdot Exw + Kixw \cdot Ixw(n) + Kdxw\{Exw(n-)-Exw(n-n1)\}$$

It should be noted that in the above equations, Ej(n) (j=xh, xp, xr and xw) are the present values of Ej, and Ej(n−n1) are values of Ej obtained n1 cycles before. Further, denoting Ij(n) and Ij(n−1) to be the current value of Ij and the value of Ij at the preceding cycle, respectively, $$Ij(n) = Ej(n) + Tx \, Ij(n-1)$$

and assuming Ijmax to be a predetermined value, the absolute value of Ij is equal to or smaller than Ijmax. The coefficients Kpj, Kij and Kdj (j=xh, xp, xr and xw) are proportional constants, integration constants and differentiation constants, respectively.

In step 390, calculations for reversal conversion of the displacement modes are carried out according to the following equations, and then the flow of control proceeds crosses to step 350:

$$P \times 1 = \tfrac{1}{4} \cdot K \times 1(C \times h - C \times p + C \times r + C \times w)$$

$$P \times 2 = \tfrac{1}{4} \cdot K \times 2(C \times h - C \times p - C \times r - C \times w)$$

$$P \times 3 = \tfrac{1}{4} \cdot K \times 3(C \times h + C \times p + C \times r - C \times w)$$

$$P \times 4 = \tfrac{1}{4} \cdot K \times 4(C \times h + C \times p - C \times r + C \times w)$$

wherein K×1, K×2, K×3 and K×4 are proportional constants.

Figure 10:
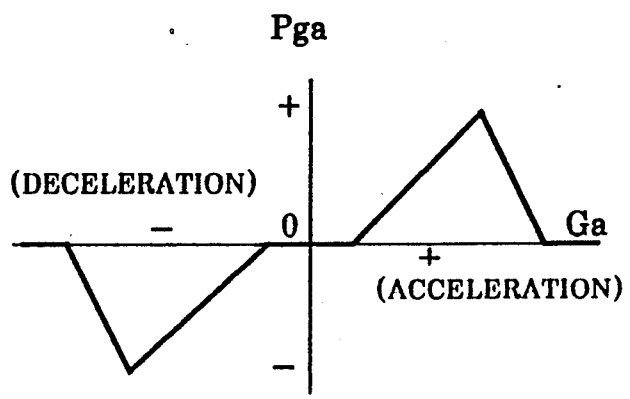
FIG. 10 is a graph showing a relation between a longitudinal acceleration Ga and a pressure compensation amount Pga.
Figure 11:
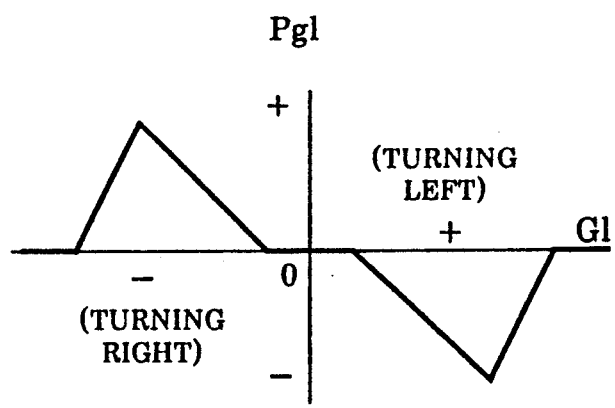
FIG. 11 is a graph showing a relation between a lateral acceleration G1 and a pressure compensation amount Pgl.
Figure 14:
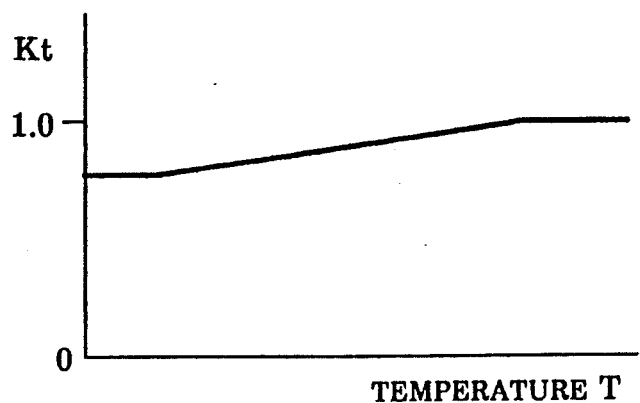
FIG. 14 is a graph showing a relation between the temperature T of oil and a compensation coefficient Kt.

In step 350, based upon maps such as the graphs shown in FIGS. 10 and 11, pressure compensations Pga and Pgl in the longitudinal and lateral directions, respectively, are calculated, and then the flow of control proceeds to step 360:

In step 360, calculations for PD compensations for acceleration feedback control are carried out with respect to pitch (Cgp) and roll (Cgr) according to the following equations, and thereafter the flow of control proceeds to step 420:

$$Cgp = Kpgp \cdot Pga + Kdgp\{Pga(n) - Pga(n-n1)\}$$

$$Cgr = Kpgr \cdot Pgl + Kdgr\{Pgl(n) - Pgl(n-n1)\}$$

Here $Pga(n)$ and $Pgl(n)$ are present $Pga$ and $Pgl$, respectively, and $Pga(n-n1)$ and $Pgl(n-n1)$ are $Pga$ and $Pgl$ at the cycle which is preceding by $n1$ cycles to the present cycle. $Kdgp$ and $Kdgr$ are proportional constants, while $Kdgp$ and $Kdgr$ are differentiation constants.

In step 370, denoting the steering angle read in at step 30 the one cycle preceding cycle in the flowchart of FIG. 3 as $As'$, steering angle velocity $RAs$ is calculated according to the following equation:

$$RAs = As - As'$$

Figure 12:
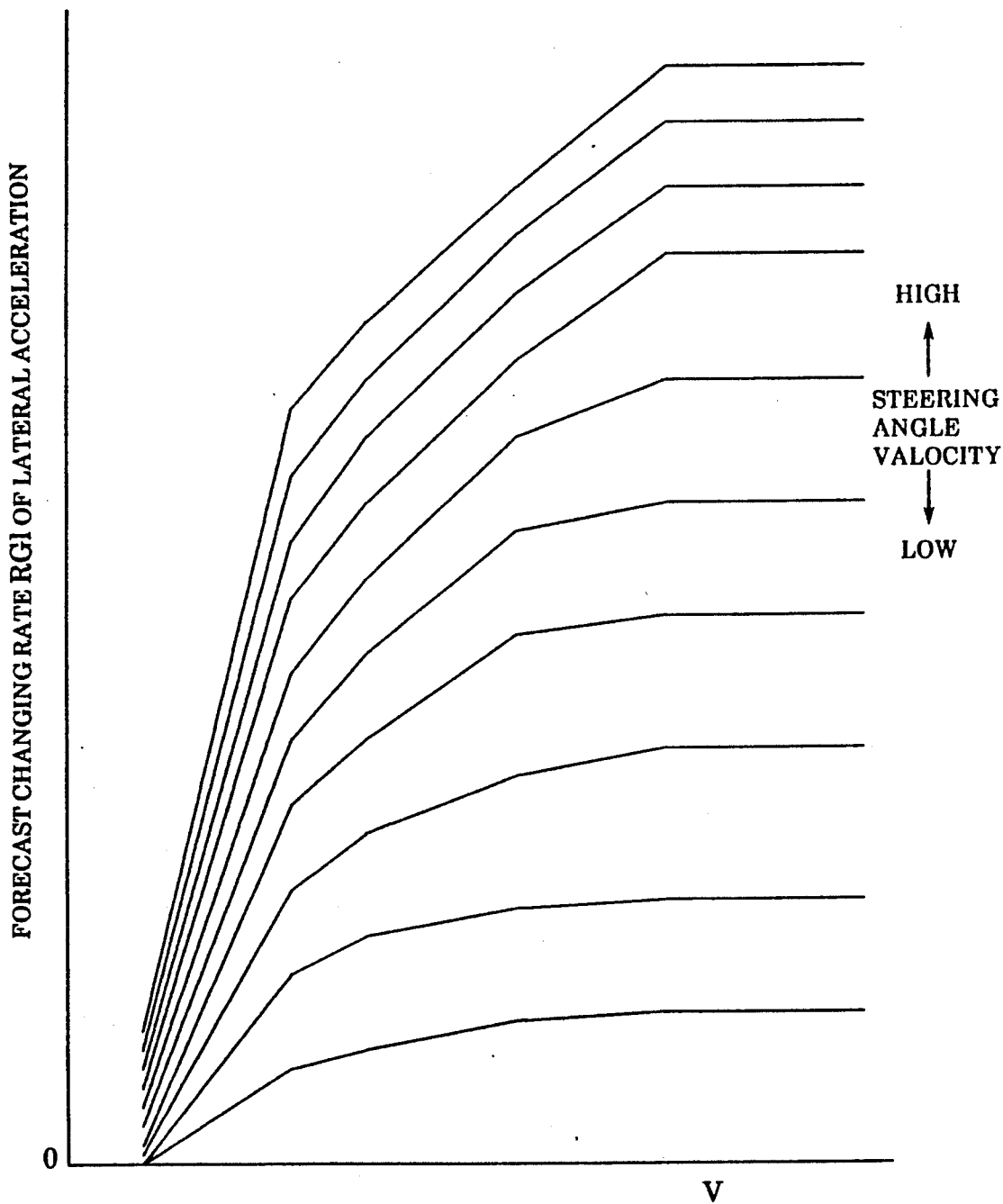
FIG. 12 is a graph showing a relation among the vehicle speed V, the steering angle velocity RAs and the changing rate RGl of the forecast lateral acceleration.

Then based upon a map such as the graph shown in FIG. 12, the steering angle velocity $RAs$ calculated above, and vehicle speed $V$, a forecast change rate $RG1$ of the lateral acceleration $G1$ is calculated, and thereafter the flow of control proceeds to the 380.

In step 380, calculations for reversal conversion of the acceleration modes are carried out according to the following equations, and then the flow of control proceeds to step 390:

$$Pg1 = Kg1/4 \cdot (-Cgp + K2f \cdot Cgr + K1f \cdot RG1)$$

$$Pg2 = Kg2/4 \cdot (-Cgp - K2f \cdot Cgr - K1f \cdot RG1)$$

$$Pg3 = Kg3/4 \cdot (Cgp + K2r \cdot Cgr + K1r \cdot RG1)$$

$$Pg4 = Kg4/4 \cdot (Cgp - K2r \cdot Cgr - K1r \cdot RG1)$$

In the above equations $Kg1$, $Kg2$, $Kg3$ and $Kg4$ are proportional constants, and $K1f$, $K1r$, $K2f$ and $K2r$ are constants for distributing gains between the front and rear vehicle wheels.

In step 390, based upon the pressures $Pbi$ stored in the RAM 208 in step 150 and the results of calculations in steps 340 and 380, target pressures $Pui$ for the pressure control means are calculated according to the following equation, and thereafter the flow of control proceeds to step 400:

$$Pui = Pxi + Pgi + Pbi (i = 1, 2, 3 \text{ and } 4)$$

In step 400, it is judged whether or not the differences $Ps-Pui$ between the pressures $Ps$ in the high pressure lines and the target pressures $Pui$ are less than a standard value $Cp$ (a certain positive value), and if it is judged that $Ps-Pui$ are not less than $Cp$, the flow of control proceeds to step 430, whereas if it is judged that $Ps-Pui$ are less than $Cp$, the flow of control proceeds to step 410.

Figure 13:
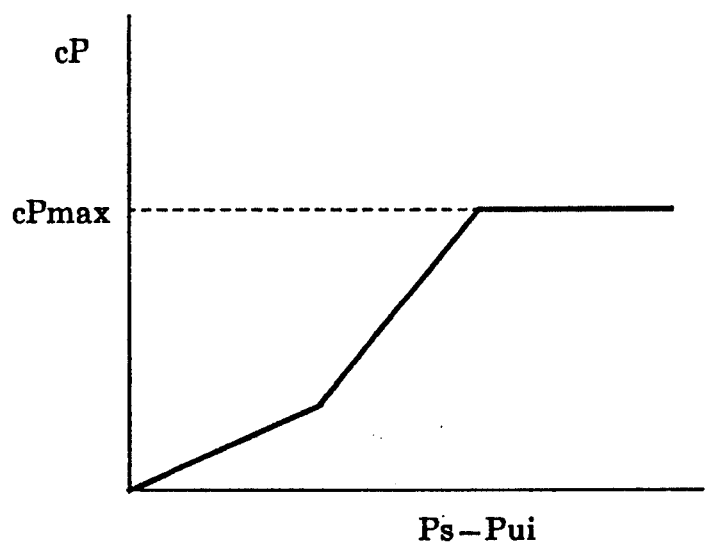
FIG. 13 is a graph showing a relation between the difference PsPui between the pressure Ps in the high pressure line and the target pressure Pui and the compensation amount cP.
Figure 15:
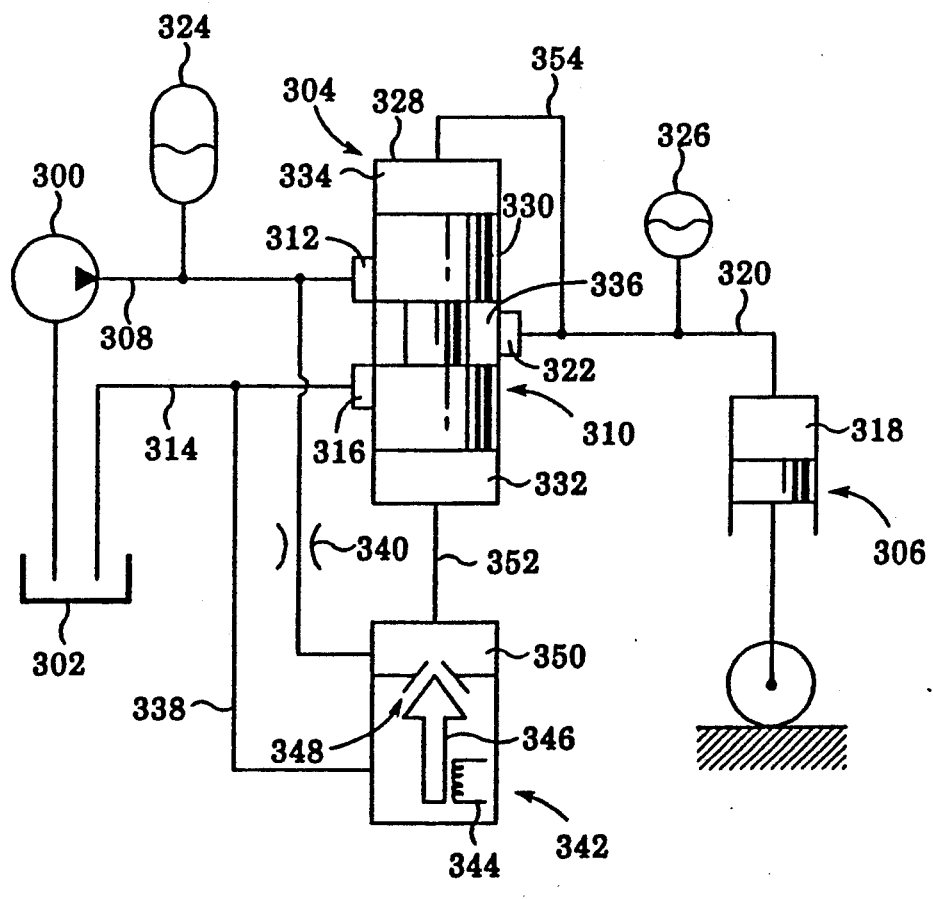
FIG. 15 is a diagrammatic illustration of a prior art fluid pressure type active suspension incorporating a pilot type pressure control means.

In step 410, based upon a map such as the graph shown in FIG. 13 a modification compensation amount $cP$ for the target pressure values is calculated, and thereafter the flow of control proceeds to step 420.

In step 420, the target pressure values are set up according to the following equation, and thereafter the flow of control proceeds to step 430:

$$Pui = Ps - Cp + cP$$

This is to modify the target pressure values $Pui$ to be lowered so much as to maintain the availability of a certain pressure difference desirable to ensure the stable control operation of the variable throttle means 54, etc. When the value of $cP$ is selected to be zero, the target pressure values $Pui$ are so much decreased as to be $Ps-Cp$ so that the desirable pressure difference $Cp$ is maintained between the source pressure $Ps$ and the target pressures $Pui$. As shown in FIG. 13, when $Ps$ lowers so much that $Ps-Pui$ is almost zero, the modification compensation amount $cP$ is selected to be almost zero. However, when the difference $Ps-Pui$ is relatively large, though the condition that $Ps-Pui$ is smaller than $Cp$ still exists, the modification compensation amount $cP$ is correspondingly increased as shown in FIG. 13 so that the convenient decrease of the values $Pui$, i.e. the decrease as much as $Cp$ from $Ps$, is more compensated by a larger $cP$, so that the convenience target pressure value $Ps-Cp+cP$ is larger as the difference $Ps-Pui$ is larger.

When the target pressure values $Pui$ are lowered from those values originally calculated according to the above-mentioned equations, the neutral point of the active suspension control, i.e. the fluid pressure value for the actuator up and down of which the pressure to be controlled temporarily deviates is somewhat shifted toward a lower pressure side, so that the active suspension control is performed with sufficient allowances for control on opposite sides of the neutral point of control. Although the vehicle height is correspondingly decreased by such lowering modification of the target pressure values $Pui$, when the rough road conditions, the continuous slalom driving or the like which would cause the undue reduction of the source fluid pressure terminates, the source fluid pressure will be quickly recovered as in a few seconds, and therefore there is no problem in temporarily lowering the target pressure values $Pui$.

In step 430, target electric currents to be supplied to the pressure control means are calculated according to the following equations, and then the flow of control proceeds to step 440:

$$I1 = Ku1 \cdot Pu1 + Kh(Psr - Ps) - Kl \cdot Pd - a$$

$$I2 = Ku2 \cdot Pu2 + Kh(Psr - Ps) - Kl \cdot Pd - a$$

$$I3 = Ku3 \cdot Pu3 + Kh(Psr - Ps) - Kl \cdot Pd$$

$$I4 = Ku4 \cdot Pu4 + Kh(Psr - Ps) - Kl \cdot Pd$$

It is to be noted that $Ku1$, $Ku2$, $Ku3$, $Ku4$ are proportional constants for the corresponding vehicle wheels; $Kh$ and $Kl$ are compensation coefficients for the pressures in the high pressure and the low pressure lines, respectively; $a$ is a compensation constant between the front and rear vehicle wheels; and $Psr$ is a standard pressure in the high pressure line.

In step 440, based upon the temperature $T$ of oil read in at step 30 and the map of the graph shown in FIG. 13, a compensation coefficient $Kt$ for the oil temperature is calculated, and the calculations for compensating the target electric currents with respect to the oil temperature are carried out according to the following equation, and then the flow of control proceeds to step 450:

$$Iti = Kt \cdot Ii (i = 1, 2, 3 \text{ and } 4)$$

In step 450, an electric current for a warping, i.e., a twisting of the vehicle body about the longitudinal axis thereof, is calculated according to the following equation, and thereafter the flow of control proceeds to step 460:

$$Iw = (It1 - It2) - (It3 - It4)$$

In step 460, denoting the target electric current value for warping as Riw, a difference of the electric current for warping from the target value therefor is calculated according to the following equation, and then the flow of control proceeds to step 470:

$$Eiw = Riw - Iw$$

In the above equation the target electric current value for warping Riw may be zero.

In step 470, employing a proportional constant Kiwp, a target control value of the electric current for warping is calculated according to the following equation, and then the flow of control proceeds to step 480:

$$Eiwp = Kiwp \cdot Eiw$$

In step 480, calculations for reversal conversion of the electric current for warping are carried out according to the following equations, and thereafter the flow of control proceeds to step 490:

$$Iw1 = Eiwp/4$$
$$Iw2 = -Eiwp/4$$
$$Iw3 = -Eiwp/4$$
$$Iw4 = Eiwp/4$$

In step 490, based upon the values obtained by the calculations conducted in steps 440 and 480, final target electric currents Iui to be supplied to the pressure control means are calculated according to the following equation, and then the flow of control proceeds to the step 170 shown in FIG. 3.

$$Iui = Iti + Iwi (i = 1, 2, 3 \text{ and } 4)$$

Thus, according to the above-described embodiment, it is judged in step 400 whether or not the differences Ps−Pui are less than the standard value Cp, and if the differences Ps−Pui are less than the standard value Cp, the compensation amount cP is calculated according to the difference in pressure based upon the map of the graph shown in FIG. 13, and then in step 420 the target values Pui for the pressure control are decreased to Ps−Cp+cP.

Therefore, if the pressure Ps in the high pressure line lowers due to running on a rough road, while on the other hand the target pressures Pui are set to certain high values as a result of calculations in steps 300–390 based upon the vehicle operation conditions, so that the differences Ps−Pui become less than the standard value Cp, then the target pressures Pui are modified to lower values, and thereby it is avoided that the variable throttle means in the pressure control means are so much closed as to approach their fully closed conditions, and thus it is avoided that the pilot pressures generated by the fixed and variable throttle means in the respective pressure control means become unstable, and therefore it is avoided that the actuators vibrate or a noise is generated due to such vibrations of the actuators.

As an alternative, in step 400, if the judgement is "yes", the target pressure Pui may be calculated as follows without calculating the modification compensation amount cP:

$$Pui = Ps - Cp$$

Although in the above the present invention has been described with respect to a particular embodiment thereof, it will be apparent for those skilled in the art that the present invention is not limited to such an embodiment and various modifications are possible within the scope of the present invention.

We claim:

1. A fluid pressure type active suspension in a vehicle such as an automobile, comprising a fluid pressure type actuator having a fluid chamber and supporting a vehicle body from a wheel so as to be able to vary a height of said vehicle body relative to said wheel in accordance with a fluid pressure supplied to said fluid chamber, a fluid supply passage means for supplying a working fluid to said fluid chamber of said actuator, a fluid exhaust passage means for exhausting the working fluid from said fluid chamber of said actuator, and a pressure control means including a switching-over valve means traversing said fluid supply passage means and said fluid exhaust passage means so as to be operated by a pilot pressure to selectively connect said fluid chamber of said actuator with either said fluid supply passage means or said fluid exhaust passage means for controlling the fluid pressure supplied to said fluid chamber of said actuator, a variable throttle means for generating said pilot pressure from the pressure of the working fluid in said fluid supply passage means by releasing a part of the working fluid therefrom, and a throttle control means for controlling said variable throttle means so as to control said pilot pressure to a target value, wherein said pressure control means comprises a means for modifying said target value to be lowered when the difference between the pressure of the working fluid in said fluid supply passage means at an upstream side of said pressure control means and said target value is smaller than a certain threshold value.

2. A fluid pressure type active suspension according to claim 1, wherein said target value is lowered to a value between said target value before the modification thereof and a difference between the pressure of the working fluid in said fluid supply passage means at the upstream side of said pressure control means and said threshold value.

3. A fluid pressure type active suspension according to claim 1, wherein said target value is lowered to a difference between the pressure of the working fluid in said fluid supply passage means at the upstream side of said pressure control means and said threshold value.

* * * * *